(12) United States Patent
Goodyear

(10) Patent No.: X9074
(45) Date of Patent: Sep. 9, 1835

(54) CEMENT, GUM ELASTIC

(76) Inventor: Charles Goodyear

Charles Goodyear
Letters Patent. Dated September 9th 1838.

The Schedule referred to in these Letters Patent and making part of the same. Containing a description in the words of the Said Charles Goodyear himself of his improvement in the Composition and manufacture of Gum Elastic Cement, Called Goodyears Transparent Cement.

---

To all persons whom it may Concern. Be it Known that I Charles Goodyear of New Haven, in the County of New Haven, in the State of Connecticut, have invented and discovered a new and usefull improvement in the Composition and manufacture of Gum Elastic Cement, free from all offensive odor, and retaining its adhesive Elastic and transparent qualities. Called Goodyear transparent cement, and the following is a full and exact description thereof.—

Having desolved the gum in the oil of turpentine or other solvents commonly used I add to the dissolved gum. Magnesia in the proportion of about Six ounces of magnesia to one pound of undissolved gum. a little more or less may answer equally well in Some cases, when the gum is applied between two pieces of cloth or is used for purposes of mending or for articles to be inflated with air a less quantity is required, Say four ounces of magnesia to the pound of gum when applied to cloth and exposed to outside wear, Eight ounces of Magnesia to the pound of gum may be used though in all cases Especially when the gum is manufactured into sheets or articles without cloth I consider Six ounces Sufficient. The process of Combining the magnesia with the gum is as follows: the magnesia is first Sifted with the finest Sieve possible, into alcohol in about the proportion of about two quarts of alcohol to one pound of magnesia. The gum having been dissolved in the proportion of about two quarts of oil of turpentine to the pound of gum being well kneaded and mixed and the magnesia being Sifted into and well ground With the alcohol the whole are then mixed and worked together untill the magnesia is taken up by the gum. at the same time any colors may be mixed and worked in with the magnesia that are required to color the gum. magnesia thus used as an absorbent causes the gum to dry in a short time. divests it when dry of its outward clammy oily quality and destroys the offensive odor of the solvent. This com-pound being transparent may afterwards be made of any colour re-quired. and therefore used for many purposes when the black article heretofore made cannot. If a pure white article is required for parchment. fine muslin. or lace. care must be taken to select the purest and whitest gum from the inner parts of the best slabs and the compound will be proportionally pure and white. I do not claim as my improvement or invention the solvents or the mode of dis-solving the gum. but I do claim as my improvement. the introduc-tion of magnesia. as an absorbent and purifier combined with the gum in prefference to all other articles for the purposes above mentioned. and therefor I solicit Letters Patent –

New Haven. August 7th. 1835.

Witnesses
R. I. Hinman
Wm H Jones

Charles Goodyear.

600 words. Exd C.F.S.

Recd & Recorded anew Oct 31. 1849.